FIG. 1

INVENTORS
TERRY W. MILLIGAN
and
RICHARD W. YOUNG
BY Brown and Mikulka
and
Ann G. Leibowitz
ATTORNEYS March 30, 1971  T. W. MILLIGAN ET AL  3,573,042
PHOTOGRAPHIC COLOR DIFFUSION TRANSFER PROCESSES AND
FILM UNIT FOR USE THEREIN
Filed July 30, 1969  4 Sheets-Sheet 2

INVENTORS
TERRY W. MILLIGAN
and
BY  RICHARD W. YOUNG
Brown and Mikulka
and
Ann G. Leibowitz
ATTORNEYS

INVENTORS
TERRY W. MILLIGAN
and
RICHARD W. YOUNG

United States Patent Office 3,573,042
Patented Mar. 30, 1971

3,573,042
PHOTOGRAPHIC COLOR DIFFUSION TRANSFER PROCESSES AND FILM UNIT FOR USE THEREIN
Terry W. Milligan, Belmont, and Richard W. Young, Wellesley Hills, Mass., assignors to Polaroid Corporation, Cambridge, Mass.
Filed July 30, 1969, Ser. No. 846,177
Int. Cl. G03c 7/00, 5/54, 1/40
U.S. Cl. 96—3                                    30 Claims

ABSTRACT OF THE DISCLOSURE

Simultaneous application of two processing compositions, one containing an opacifying agent and the other a reflecting material, to an exposed permanently structured film unit to obtain a color diffusion transfer therein.

The present invention relates to photography and, more particularly, to photographic products particularly adapted for employment in photographic diffusion transfer color processes.

The primary objects of the present invention are to provide photographic products particularly adapted for employment in diffusion transfer photographic color processes; to provide photographic products which comprise a photosensitive composite structure or laminate which contains a plurality of essential layers including a dimensionally stable layer preferably opaque to actinic radiation, a polymeric acid layer containing sufficient acidifying groups to effect reduction of a selected processing solution having a first pH at which a dye image-forming material is soluble and diffusible to a second pH at which the dye image-forming material is substantially insoluble and nondiffusible, a photosensitive silver halide emulsion layer having a dye image-forming material associated therewith which is soluble and diffusible, in alkali, at the first pH, a permeable polymeric layer dyeable by the dye image-forming material, and a dimensionally stable transparent layer; to provide photographic diffusion transfer products comprising a film unit including a photosensitive laminate, of the last-identified type, in combination with rupturable container means separately retaining a first aqueous processing composition containing dispersed therein an opacifying agent and a second aqueous processing composition containing dispersed therein a reflecting agent, the first and second compositions together possessing the first pH and the opacifying and reflecting agents together present, upon distribution, in a quantity sufficient to mask the dye image-forming material associated with the photosensitive silver halide emulsion layer and to prevent exposure of the emulsion layer during processing in the presence of radiation actinic thereto and incident on said dimensionally stable transparent layer; to provide a diffusion transfer film unit, of the last-identified type, having the container means fixedly positioned and extending transverse a leading edge of the photosensitive laminate whereby to effect, upon application of compressive pressure, discharge of the first and second processing compositions in order intermediate the opposed surfaces of the photosensitive silver halide emulsion and the dyeable polymeric layer next adjacent; and to provide photographic diffusion transfer color processes employing such products.

Other objects of the invention will in part be obvious and will in part appear hereinafter.

The invention accordingly comprises the product possessing the features, properties and the relation of components and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGS. 2, 4 and 6 are diagrammatic enlarged cross-sectional views of the film unit of FIG. 1, along section line 2—2, illustrating the association of elements during the three illustrated stages of the performance of a diffusion transfer process, for the production of a multicolor transfer image according to the invention, the thickness of the various materials being exaggerated, and wherein FIG. 2 represents an exposure stage, FIG. 4 represents a processing stage and FIG. 6 represents a product of process.

As disclosed in U.S. Pat. No. 2,983,606, issued May 9, 1961, a photosensitive element containing a dye developer, that is, a dye which is a silver halide developing agent, and a silver halide emulsion may be exposed and wetted by a liquid processing composition, for example, by immersion, coating, spraying, flowing, etc., in the dark, and the exposed photosensitive element is superposed prior to, during, or after wetting, on a sheetlike support element which may be utilized as an image-receiving element. In a preferred embodiment, the liquid processing composition is applied to the photosensitive element in a substantially uniform layer as the photosensitive element is brought into superposed relationship with the image-receiving layer. The liquid processing composition, positioned intermediate the photosensitive element and the image-receiving layer, permeates the emulsion to initiate development of the latent image contained therein. The dye developer is immobilized or precipitated in exposed areas as a consequence of the development of the latent image. This immobilization is apparently, at least in part, due to a change in the solubility characteristics of the dye developer upon oxidation and especially as regards its solubility in alkaline solutions. It may also be due in part to a tanning effect on the emulsion by oxidized developing agent, and in part to a localized exhaustion of alkali as a result of development. In unexposed and partially exposed areas of the emulsion, the dye developer is unreacted and diffusible and thus provides an imagewise distribution of unoxidized dye developer dissolved in the liquid processing composition, as a function of the point-to-point degree of exposure of the silver halide emulsion. At least part of this imagewise distribution of unoxidized dye developer is transferred, by imbibition, to a superposed image-receiving layer or element, said transfer substantially excluding oxidized dye developer. The image-receiving element receives a depthwise diffusion, from the developed emulsion, of unoxidized dye developer without appreciably disturbing the imagewise distribution thereof to provide the reversed or positive color image of the developed image. The image-receiving element may contain agents adapted to mordant or otherwise fix the diffused, unoxidized dye developer. If the color of the transferred dye developer is affected by changes in the pH of the image-receiving element, this pH may be adjusted in accordance with well-known techniques to provide a pH affording the desired color. The desired positive image is revealed by stripping the image-receiving layer from the photosensitive element at the end of a suitable imbibition period.

The dye developers, as noted above, are compounds which contain, in the same molecule, both the chromophoric system of a dye and also a silver halide developing function. By "a silver halide developing function" is meant a grouping adapted to develop exposed silver halide. A preferred silver halide development function is a hydroquinonyl group. Other suitable developing functions include ortho-dihydroxyphenyl and ortho- and para-amino substituted hydroxyphenyl groups. In general, the development function includes a benzenoid developing function, that is, an aromatic developing group which forms quinonoid or quinone substances when oxidized.

Multicolor images may be obtained using color image-forming components such as, for example, the previously mentioned dye developers, in diffusion transfer processes by several techniques. One such technique contemplates obtaining multicolor transfer images utilizing dye developers by employment of an integral multilayer photosensitive element, such as is disclosed in the aforementioned U.S. Pat. No. 2,983,606, and particularly with reference to FIG. 9 of the patent's drawing, wherein at least two selectively sensitized photosensitive strata, superposed on a single support, are processed, simultaneously and without separation, with a single, common image-receiving layer. A suitable arrangement of this type comprises a support carrying a red-sensitive silver halide emulsion stratum, a green-sensitive silver halide emulsion stratum and a blue-sensitive silver halide emulsion stratum, said emulsions having associated therewith, respectively, for example, a cyan dye developer, a magenta dye developer and a yellow dye developer. The dye developer may be utilized in the silver halide emulsion layer, for example, in the form of particles, or it may be employed as a layer behind the appropriate silver halide emulsion strata. Each set of silver halide emulsion and associated dye developer strata are disclosed to be optionally separated from other sets by suitable interlayers, for example, by a layer of gelatin or polyvinyl alcohol. In certain instances, it may be desirable to incorporate a yellow filter in front of the green-sensitive emulsion and such yellow filter may be incorporated in an interlayer. However, where desirable, a yellow dye developer of the appropriate spectral characteristics and present in a state capable of functioning as a yellow filter may be employed. In such instances, a separate yellow filter may be omitted.

The dye developers are preferably selected for their ability to provide colors that are useful in carrying out subtractive color photography, that is, the previously mentioned cyan, magenta and yellow. The dye developers employed may be incorporated in the respective silver halide emulsion or, in the preferred embodiment, in a separate layer behind the respective silver halide emulsion. Specifically, the dye developer may, for example, be in a coating or layer behind the respective silver halide emulsion and such a layer of dye developer may be applied by use of a coating solution containing about 0.5 to 8%, by weight, of the respective dye developer distributed in a film-forming natural, or synthetic, polymer, for example, gelatin, polyvinyl alcohol, and the like, adapted to be permeated by the chosen diffusion transfer fluid processing composition.

As disclosed in U.S. Pat. No. 3,362,819, image-receiving elements, particularly adapted for employment in diffusion transfer processes of the type disclosed in aforementioned U.S. Pat. No. 2,983,606, wherein the image-receiving elements are separated from contact with a superposed photosensitive element, subsequent to substantial transfer image formation, preferably comprise a support layer possessing on one surface thereof, in sequence, a polymeric acid layer and an image-receiving layer adapted to provide a visible image upon transfer to said layer of diffusible dye image-forming substance, and most preferably include an inert timing or spacer layer intermediate the polymeric acid layer and the image-receiving layer.

As disclosed in U.S. Pat. No. 3,362,821, photosensitive elements, particularly adapted for employment in diffusion transfer processes of the last-mentioned character, preferably comprise a support layer carrying, in order, on one surface, a polymeric acid layer and a photosensitive silver halide emulsion layer having a dye developer associated therewith, and most preferably also include a spacer layer intermediate the polymeric acid and next adjacent silver halide emulsion and associated dye developer layers.

As set forth in aforementioned U.S. Pats. Nos. 3,362,819 and 3,362,821, the polymeric acid layer comprises polymers which contain acid groups, such as carboxylic acid and sulfonic acid groups, which are capable of forming salts with alkali metals, such as sodium potassium etc., or with organic bases, particularly quaternary ammonium bases, such as tetramethyl ammonium hydroxide, or potentially acid-yielding groups, such as anhydrides or lactones, or other groups which are capable of reacting with bases to capture and retain them. The acid reacting group is, of course, nondiffusible from the acid polymer layer. In the preferred embodiments disclosed, the acid polymer contains free carboxyl groups and the transfer processing composition employed contains a large concentration of sodium and/or potassium ions. The acid polymers stated to be most useful are characterized by containing free carboxyl groups, being insoluble in water in the free acid form, and by forming water-soluble sodium and/or potassium salts. One may also employ polymers containing carboxylic acid anhydride groups, at least some of which preferably have been converted to free carboxyl groups prior to imbibition. While the most readily available polymeric acids are derivatives of cellulose or of vinyl polymers, polymeric acids from other classes of polymers may be used. As examples of specific polymeric acids set forth in the application, mention may be made of dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives or cellulose modified with sulfoanhydrides, e.g., with ortho-sulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid, partial esters of ethylene/maleic anhydride copolymers; partial esters of methyl-vinyl ether/maleic anhydride copolymers; etc.

The acid polymer layer is disclosed to contain at least sufficient acid groups to effect a reduction in the pH of the image layer from a pH of about 13 to 14 to a pH of at least 11 or lower at the end of the imbibition period, and preferably to a pH of about 5 to 8 within a short time after imbibition. As previously noted, the pH of the processing composition preferably is of the order of at least 13 to 14.

It is, of course, necessary that the action of the polymeric acid be so controlled as not to interfere with either development of the negative or image transfer of unoxidized dye developers. For this reason, the pH of the image layer is kept at a level of pH 12 to 14 until the dye image has been formed after which the pH is reduced very rapidly to at least about pH 11, and preferably about pH 9 to 10, before the transfer image is separated and exposed to air. Unoxidized dye developers containing hydroquinonyl developing radicals diffuse from the negative to the positive as the sodium or other alkali salt. The diffusion rate of such dye image-forming components thus is at least partly a function of the alkali concentration, and it is necessary that the pH of the image layer remain on the order of 12 to 14 until transfer of the necessary quantity of dye has been accomplished. The subsequent pH reduction, in addition to its desirable effect upon image light stability, serves a highly valuable photographic function by substantially terminating further dye transfer. The processing technique thus effectively minimizes changes in color balance as a result of longer imbibition times in multicolor transfer processes using multilayer negatives.

In order to prevent premature pH reduction during transfer processing, as evidenced, for example, by an undesired reduction in positive image density, the acid groups are disclosed to be so distributed in the acid polymer layer that the rate of their availability to the alkali is controllable, e.g., as a function of the rate of swelling of the polymer layer which rate in turn has a direct relationship to the diffusion rate of the alkali ions. The desired distribution of the acid groups in the acid polymer layer may be effected by mixing the acid polymer with a polymer free of acid groups, or lower in concentration of acid groups, and compatible therewith, or by using only the acid polymer but selecting one having a relatively lower proportion of acid groups. These embodiments are illustrated, respectively, in the cited copending application, by (a) a mixture of cellulose acetate and cellulose acetate hydrogen phthalate and (b) a cellulose acetate hydrogen phthalate polymer having a much lower percentage of phthalyl groups than the first-mentioned cellulose acetate hydrogen phthalate.

It is also disclosed that the layer containing the polymeric acid may contain a water-insoluble polymer, preferably a cellulose ester, which acts to control or modulate the rate at which the alkali salt of the polymer acid is formed. As examples of cellulose esters contemplated for use, mention is made of cellulose acetate, cellulose acetate butyrate, etc. The particular polymers and combinations of polymers employed in any given embodiment are, of course, selected so as to have adequate wet and dry strength and when necessary or desirable, suitable subcoats may be empoyled to help the various polymeric layers adhere to each other during storage and use.

The inert spacer layer of the aforementioned U.S. patents, for example, in inert spacer layer comprising polyvinyl alcohol or gelatin, acts to "time" control the pH reduction by the polymeric acid layer. This timing is disclosed to be a function of the rate at which the alkali diffuses through the inert spacer layer. It was stated to have been found that the pH does not drop until the alkali has passed through the spacer layer, i.e., the pH is not reduced to any significant extent by the mere diffusion into the interlayer, but the pH drops quite rapidly once the alkali diffuses through the spacer layer.

As disclosed in the last-mentioned U.S. patents, the presence of an inert spacer layer was found to be effective in evening out the various reaction rates over a wide range of temperatures, for example, by preventing premature pH reduction when imbibition is effected at temperatures above room temperature, for example, at 95 to 100° F. By providing an inert spacer layer, that application discloses that the rate at which alkali is available for capture in the polymeric acid layer becomes a function of the alkali diffusion rates.

However, as disclosed in U.S. Pat. 3,455,686, preferably the aforementioned rate at which the cations of the alkaline processing composition, i.e., alkali ions, are available for capture in the polymeric acid layer should be decreased with increasing transfer processing temperatures in order to provide diffusion transfer color processes relatively independent of positive transfer image variations over an extended range of ambient temperatures.

Specifically, it is there stated to have been found that the diffusion rate of alkali through a permeable inert polymeric spacer layer increases with increased processing temperature to the extent, for example, that relatively high transfer processing temperatures, that is, transfer processing temperatures above approximately 80° F., a premature decrease in the pH of the transfer processing composition occurs due, at least in part, to the rapid diffusion of alkali from the dye transfer environment and its subsequent neutralization upon contact with the polymeric acid layer. This was stated to be especially true of alkali traversing an inert spacer layer possessing permeability to alkali optimized to be effective within the temperature range of optimum transfer processing. Conversely, at temperatures below the optimum transfer processing range, for example, temperatures below approximately 40° F., the last-mentioned inert spacer layer was disclosed to provide an effective diffusion barrier timewise preventing effective traverse of the inert spacer layer by alkali having temperature depressed diffusion rates and to result in maintenance of the transfer processing environment's high pH for such an extended time interval as to facilitate formation of transfer image stain and its resultant degradation of the positive transfer images' color definition.

It is further stated in the last-mentioned patent to have been found, however, that if the inert spacer layer of the print-receiving element is replaced by a spacer layer which comprises a permeable polymeric layer exhibiting permeability inversely dependent on temperature, that is, a polymeric film-forming material which exhibits decreasing permeability to solubilized alkali derived cations such as alkali metal and quaternary ammonium ions under conditions of increasing temperature that the positive transfer image defects resultant from the aforementioned overextended pH maintenance and/or premature pH reduction are obviated.

As examples of polymers which were disclosed to exhibit inverse temperature-dependent permeability to alkali, mention may be made of: hydroxypropyl polyvinyl alcohol, polyvinyl methyl ether, polyethylene oxide, polyvinyl oxazolidinone, hydroxypropyl methyl cellulose, isopropyl cellulose, partial acetals of polyvinyl alcohol such as partial polyvinyl butyral, partial polyvinyl formal, partial polyvinyl acetal, partial polyvinyl propional, and the like.

The last-mentioned specified acetals of polyvinyl alcohol were stated to generally comprise saturated aliphatic hydro-carbon chains of a molecular weight of at least 1000, preferably of about 1000 to 50,000, possessing a degree of acetalation within about 10 to 30%, 10 to 30%, 20 to 80%, and 10 to 40%, of the polyvinyl alcohols' theoretical polymeric hydroxyl groups, respectively, and including mixed acetals where desired.

Where desired, a mixture of the polymers is to be employed, for example, a mixture of hydroxypropyl methyl cellulose and partial polyvinyl butyral.

As examples of materials, for use as the image-receiving layer, mention may be made of solution dyeable polymers such as nylons as, for example, N-methoxymethyl polyhexamethylene adipamide; partially hydrolyzed polyvinyl acetate; polyvinyl alcohol with or without plasticizers; cellulose acetate with filler as, for example, one-half cellulose acetate and one-half oleic acid; gelatin; and other materials of a similar nature. Preferred materials comprise polyvinyl alcohol or gelatin containing a dye mordant such as poly-4-vinylpyridine, as disclosed in U.S. Pat. No. 3,148,061, issued Sept. 8, 1964.

As disclosed in the previously cited patents, the liquid processing composition referred to for effecting multicolor diffusion transfer processes comprises at least an aqueous solution of an alkaline material, for example, diethylamine, sodium hydroxide or sodium carbonate and the like, and preferably possessing a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose or sodium carboxymethyl cellulose. Additionally, film-forming materials or thickening agents whose ability to increase viscosity is substantially unaffected if left in solution for a long period of time are also disclosed to be capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

In accordance with aforementioned U.S. Pat. No. 2,983,606, an image-receiving layer of the type disclosed in that patent need not be separated from its superposed contact with the photosensitive element, subsequent to transfer image formation, if the image-receiving element is transparent and a processing composition containing a substance rendering the dried processing composition layer opaque is spread between the image-receiving layer and the silver halide emulsion or emulsions.

However, it has been found, if the image-receiving element is maintained in contact with the photosensitive element, subsequent to dye developer transfer image formation, and includes the presence of an alkaline processing composition, necessarily having a pH at which dye developer, for example, in reduced form, diffuses to form the dye transfer image, intermediate the elements, the transfer image thus formed is unstable over an extended period of time. The dye image instability is due, at least in part, to the presence of what is, in general, a relatively high pH alkaline composition in intimate contact with the dye or dyes forming the image. This contact itself provides instability to the molecular structure of dye by, for example, catalyzing degradation and undesirable structural shifts affecting the spectral absorption characteristics of the image dye. In addition, the presence of an alkaline composition, possessing a pH at which the dye, for example, in reduced form, diffuses also provides an integral dynamic system wherein oxidized dye, immobilized in areas of the photosensitive element, as a function of its development, with the passage of time attempts to generate, in such areas, an equilibrium between oxidized and reduced dye. In that the pH of the dynamic system is such that discussion of the reduced form of the dye will occur, such reduced dye will, at least in part, transfer to the image-receiving layer and the resultant diffusion will imbalance the equilibrium, in such areas of the photosensitive element, in favor of additional formation of reduced dye. As a function of the efficiency of the image-receiving layer, as a dye sink, such non-imagewise dyeing of the image-carrying layer still further imbalances the equilibrium in favor of the additional formation of dye in reduced, diffusible form. Under such circumstances, the transfer image definition, originally carried by the image-receiving layer, will suffer a continuous decrease in the delta between the image's maximum and minimum densities and may, ultimately, result in the image-receiving element's loss of all semblance of image definition; merely becoming a polymeric stratum carrying a relatively uniform overall dyeing.

Any attempt to decrease the dye sink capacity of the image-carring layer, for example, by reduction of its nordant capacity, in order to alleviate, at least to an extent, the action of the image-receiving layer as a dye sink, however, will enhance diffusion of the dye, comprising the transfer image, from the image-carrying layer, to the remainder of the element due, at least in part, to the continued presence of the alkaline composition having a pH at which the reduced form of the dye, forming the transfer image, is diffusible. The ultimate result is substantially the same overall image distortion as occurs when the image-receiving layer acts as a dye sink, with the exception that the dye is more extensively distributed throughout the film unit and the ultimate overall dyeing of the image-receiving layer itself is of lower saturation.

As previously discussed, aforementioned U.S. Pat. No. 3,362,821, discloses certain photosensitive elements particularly adapted for employment in diffusion transfer color processes, wherein the image-receiving element is separated from contact with a superposed photosensitive element, subsequent to substantial transfer image formation, and which elements provide particular protection of transfer images from the effects of aerial oxidation of dyes forming the color transfer image.

It has now quite unexpectedly been discovered that the problems inherent in fabricating a film unit of the type wherein the image receiving element, the alkaline processing composition and the photosensitive element are maintained in contiguous contact subsequent to dye transfer image formation, for example, a film unit of the type described hereinbefore with reference to aforementioned U.S. Pat. No. 2,983,606, may be simply and effectively obviated by fabrication of a film unit in accordance with the physical parameters hereinafter specifically set forth.

Specifically, it has now been unexpectedly discovered that an integral photographic film unit particularly adapted for the production of a dye transfer image of unexpectedly improved stability and other properties, by a color diffusion transfer process described hereinafter, will be constructed to include a photosensitive element comprising a composite structure or laminate having, in sequence as essential layers, a dimensionally stable layer preferably opaque to actinic radiation; an alkaline solution permeable polymeric acid layer containing sufficient acidifying groups to effect reduction, subsequent to substantial transfer dye image formation of a selected processing solution having a first pH at which a dye image-providing material is soluble and diffusible to a second pH at which said dye image-providing material is substantially insoluble and nondiffusible; a photosensitive silver halide emulsion layer having associated therewith dye image-providing material which is soluble and diffusible, in alkali at the first pH; an alkaline solution permeable polymeric layer dyeable by the dye image-providing material; and a dimensionally stable transparent layer. In combination with the laminate, rupturable container means separately retaining a first aqueous processing composition containing an opacifying agent and a second processing composition containing a reflecting agent, which compositions, taken together, possess the first pH and a concentration of opacifying and reflecting agents in a quantity sufficient, upon distribution, to mask the dye image-providing material associated with the emulsion layer and to prevent exposure of that layer during processing in the presence of actinic radiation incident on the dimensionally stable transparent support layer, is fixedly positioned and extends transverse a leading edge of the laminate, whereby to effect unidirectional discharge of the container's contents, in order layerwise, between the photosensitive silver halide emulsion layer and adjacent alkaline solution permeable and dyeable polymeric layer, upon application of compressive force to the container means.

In the particularly preferred embodiment of the present invention, a processing composition permeable polymeric sheet, transparent in at least those embodiments wherein the first-mentioned dimensionally stable layer is opaque to actinic radiation, is positioned intermediate the dyeable polymeric layer and silver halide emulsion next adjacent, and the container means is specifically adapted to distribute the first processing composition intermediate the silver halide emulsion and polymeric sheet and the second composition intermediate the dyeable polymeric layer and the polymeric sheet. Such construction has been specifically found to obviate, to the maximum extent, incidence of processing composition intermixing, due to turbulence, during substantially simultaneous distribution of the separate processing compositions in contiguous relationship next adjacent each other. The preferred construction facilitates the substantially simultaneous distribution of the respective processing compositions as substantially separate, individual layers, in the order designated layerwise and specifically required for the practice of the present invention. In addition, the preferred construction provides maximum flexibility in terms of processing composition selection, and distribution conditions, in view of the resultant independence of the selected compositions from consideration of the effect of their rheological characteristics upon turbulent intermixing generated in any selected system requiring substantially contemporaneous contiguous distribution.

In a preferred embodiment of the present invention specifically adapted to provide for the production of a multicolor dye transfer image, the photosensitive laminate comprises, in order of essential layers, the dimensionally stable opaque layer; the alkaline solution permeable polymeric acid layer containing sufficient acidifying groups to effect reduction, subsequent to substantial multicolor transfer dye image formation, of a processing composition having a first pH at which the dye image-providing materials are soluble and diffusible to a second pH, at which the dye image-providing material is substantially insoluble and nondiffusible; at least two selectively sensitized silver halide emulsion strata each having dye image-providing materials of predetermined color associated therewith which are soluble and diffusible, in alkali, at the first pH; the alkaline solution permeable polymeric layer dyeable by the dye image-providing materials; and the dimensionally stable transparent layer.

The silver halide emulsions comprising the multicolor photosensitive laminate preferably possess predominant spectral sensitivity to separate regions of the spectrum and each has associated therewith a dye, which is a silver halide developing agent and is, most preferably, substantially soluble in the reduced form only at the first pH, possessing a spectral absorption range substantially complementary to the predominant sensitivity range of its associated emulsion.

In the preferred embodiment, each of the emulsion strata, and its associated dye, is separated from the remaining emulsion strata, and their associated dye, by separate alkaline solution permeable polymeric interlayers and the photosensitive laminate is separated from the polymeric acid layer by an alkaline solution permeable polymeric spacer layer, most preferably a polymeric spacer layer having decreasing permeability to alkaline solution with increasing temperature.

In such preferred embodiment of the invention, the alkaline solution permeable polymeric acid layer is transparent and about 0.3 to 1.5 mils in thickness; the alkaline solution permeable polymeric spacer layer intermediate the polymeric acid layer and next adjacent dye layer is transparent and about 0.1 to 0.7 mil in thickness; the silver halide emulsion comprises photosensitive silver halide dispersed in gelatin and is about 0.6 to 6 microns in thickness; the dye itself is dispersed in an aqueous alkaline solution polymeric binder, preferably gelatin, as a separate layer about 1 to 7 microns in thickness; the alkaline solution permeable polymeric interlayers, preferably gelatin, are about 1 to 5 microns in thickness; the alkaline solution permeable and dyeable polymeric layer is transparent and about 0.25 to 0.4 mil in thickness; and each of the dimensionally stable opaque and transparent layers are alkaline solution impermeable and about 2 to 6 mils in thickness. It will be specifically recognized that the relative dimensions recited above may be appropriately modified, in accordance with the desires of the operator, with respect to the specific product to be ultimately prepared.

In view of the fact that the preferred dye image-providing materials comprise dyes which are silver halide developing agents, as stated above, the present invention will be further described hereinafter in terms of such dyes without limitation of the invention to the illustrative dyes.

The respective layers comprising the composite structure are secured in fixed relationship which, in whole or in part, may be readily and simply achieved by retaining means such as, for example, a pressure-sensitive tape binding member extending around the edges of the composite structure securing or maintaining the layers of the composite together at their respective edges.

In the preferred embodiment of the present invention's film unit for the production of a multicolor transfer image, the respective silver halide/dye developer units of the photosensitive element will be in the form of a tripack configuration which will ordinarily comprise a cyan dye developer/red-sensitive emulsion unit contiguous the dimensionally stable opaque layer, the yellow dye developer/blue-sensitive emulsion unit most distant from the opaque layer and the magenta dye developer/green-sensitive emulsion unit intermediate those units, recognizing, that the relative order of such units may be varied in accordance with the desires of the operator.

It will also be recognized that the dimensionally stable polymeric support layer next adjacent the polymeric acid layer may be transparent and in such instance the photosensitive emulsions may be selectively optimized for exposure by actinic radiation incident on the selected transparent polymeric support layer. Such film units, preferably will additionally contain an opaque sheet fixedly positioned, for example, extending transverse a leading edge of the unit, adapted to be superposed on and coextensive with the surface of the transparent support layer opposite the silver halide emulsion layer next adjacent.

Employment of the detailed film unit of the present invention, according to the hereinafter described color diffusion transfer photographic process, specifically provides for the production of a highly stable color transfer image accomplished, at least in part, by effectively obviating the previously discussed disadvantages of the prior art products and processes, by in process adjustment of the environmental pH of the film unit from a pH at which transfer processing is operative to a pH at which dye transfer is inoperative subsequent to substantial transfer image formation. The stable color transfer image is obtained irrespective of the fact that the film unit is maintained as an integral laminate unit during exposure, processing in the presence of actinic radiation, viewing, and storage of the unit. Accordingly, by means of the present invention, multicolor transfer images may be provided by processing in the presence of actinic radiation over an extended processing temperature range, which exhibit desired maximum and minimum dye transfer image densities; yellow, magenta and cyan dye saturation; red, green and blue hues; and color separation. These advantages are in addition to the manufacturing advantages obtained by reason of the present invention's integral color transfer film unit and which will be readily apparent from examination of the unit's parameters, that is, for example, advantages in more efficient utilization of fabricating materials and components, enhanced simplicity of film manufacture and camera design and construction, and more simplified and effectively controlled customer utilization of the unit.

Reference is now made to FIGS. 1 through 7 of the drawings wherein there is illustrated a preferred film unit of the present invention and wherein like numbers, appearing in the various figures, refer to like components.

As illustrated in the drawings, FIG. 1 sets forth a perspective view of the film unit, designated 10, and each of FIGS. 2 through 7 illustrate diagrammatic cross-sectional views of the film unit 10, along the stated section lines 2—2, 3—3, 5—5 and 7—7, during the various depicted stages in the performance of a photographic diffusion transfer process as detailed hereinafter.

Film unit 10 comprises rupturable containers 11 and 11a retaining, prior to processing, aqueous alkaline solutions 12 and 12a, and photosensitive laminate 13 including, in order, dimensionally stable opaque layer 14, preferably an actinic radiation-opaque flexible sheet material; neutralizing layer 26; spaced layer 25, cyan dye developer layer 15; red-senstive silver halide emulsion layer 16; interlayer 17; magenta dye developer layer 18; green-sensitive silver halide emulsion layer 19; interlayer 20 which may contain an auxiliary silver halide developing agent; yellow dye developer layer 21; blue-sensitive silver halide emulsion layer 22; auxiliary layer 23; image-receiving layer 24 and dimensionally stable transparent layer 27, preferably an actinic radiation transmissive flexible sheet material.

The structural integrity of composite 13 may be maintained, at least in part, by the adhesive capacity exhibited between the various layers comprising the laminate at their opposed surfaces. However, the adhesive capacity exhibited at an interface intermediate image-receiving layer 24 and the silver halide emulsion layer next adjacent thereto, for example, intermediate image-receiving layer 24 and auxiliary layer 23 as illustrated in FIGS. 2 through 7, should be less than that exhibited at the interface between the opposed surfaces of the remainder of the layers forming the laminate, in order to facilitate distribution of processing solutions 12 and 12a intermediate the stated image-receiving layer 24 and the silver halide emulsion layer next adjacent thereto. The laminate's structural integrity may also be enhanced or provided, in whole or in part, by providing a binding member extending around, for example, the edges of laminate 13, and maintaining the layers comprising the laminate intact, except at the interface between layers 23 and 24 during distribution of solutions 12 and 12a intermediate those layers. As illustrated in the figures, the binding member may comprise a pressure-sensitive tape 28 securing and/or maintaining the layers of composite 13 together at its respective edges. Tape 28 will also act to maintain processing solutions 12 and 12a intermediate image-receiving layer 24 and the silver halide emulsion layer next adajacent thereto, upon application of compressive pressure to pods 11 and 11a and distribution of their contents, intermediate the stated layers. Under such circumstances, binder tape 28 will act to prevent leakage of processing composition from the film unit's laminate during the subsequent to protographic processing.

Rupturable containers 11 and 11a may be of any suitable configuration adapted to retain and distribute the processing composition and may comprise, for example, the types shown and described in any of U.S. Pats. Nos. 2,543,181; 2,607,685; 2,634,886; 2,653,732; 2,674,532; 2,702,146; 2,723,051; 2,750,075; 2,903,829; 2,992,102; 3,056,491; 3,056,492; 3,152,515; 3,173,580; 3,221,942; and the like. In general, such containers may comprise a rectangular blank of fluid- and air-impervious sheet material folded longitudinally upon itself to form two walls 29 which are sealed to one another along their longitudinal and end margins to form a cavity in which processing solutions 12 and 12a are retained. The longitudinal marginal seal 30 is made weaker than the end seals 31 so as to become unsealed in response to the hydraulic pressure generated within the fluid contents 12 and 12a of the containers by the application of compressive pressure to walls 29 of the containers.

In particular fluid containers particularly adapted to retain photographic processing compositions may be formed of a plurality of layers including, respectively, an outer layer, for example, kraft paper; a layer of metallic foil, for example, lead foil; and an inner lining, or layer, of a thermoplastic resin, for example, a polyvinyl acetal such as polyvinyl butyral, polyvinyl chloride and the like. It will also be recognized that the rupturable container means may comprise a single compartmented rupturable container separately retaining the designated processing solutions such as, for example, compartmented rupturable containers of the type set forth in FIG. 8 of U.S. Pat. No. 2,992,102 or the like. Such compartmented rupturable containers may simply employ a polymeric separator sheet effectively separating a rupturable container's single chamber into two separate container chambers sufficiently insulating the opacifying and reflective agents from admixture and which sheet may extend intermediate and beyond, if transparent and permeable, longitudinal marginal seal to facilitate simultaneous distribution of each compartment's fluid contents as a functionally separate medium.

Figure 1:
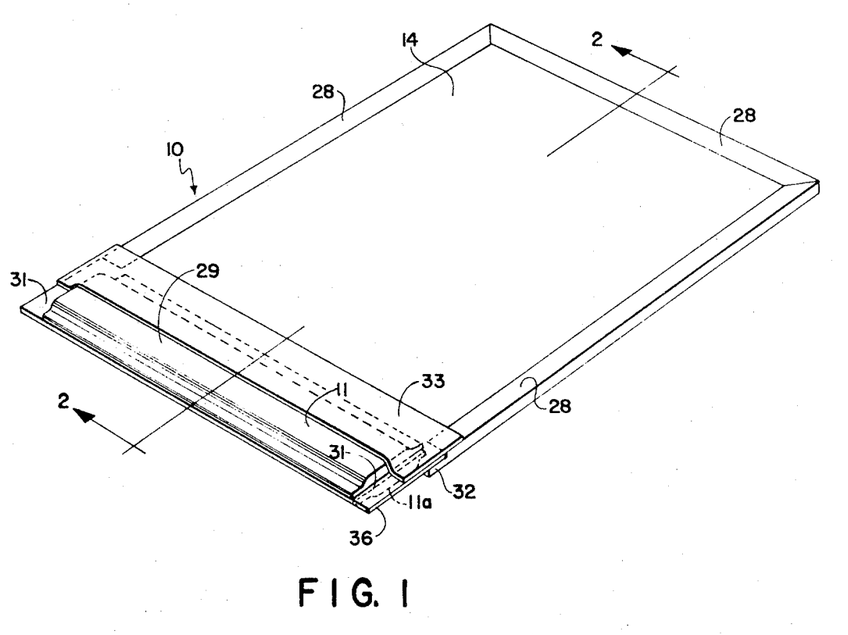
FIG. 1 is a perspective view of a photographic film unit embodying the invention.
Figure 2:
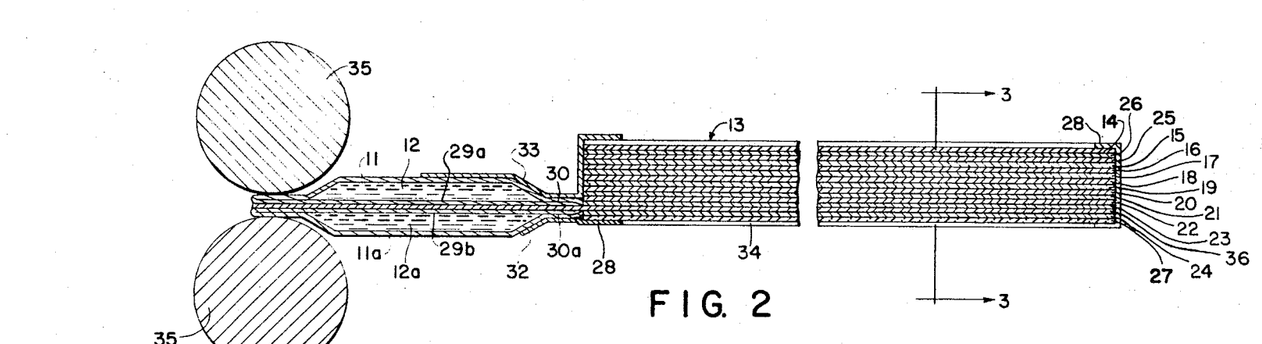
Figure 3:
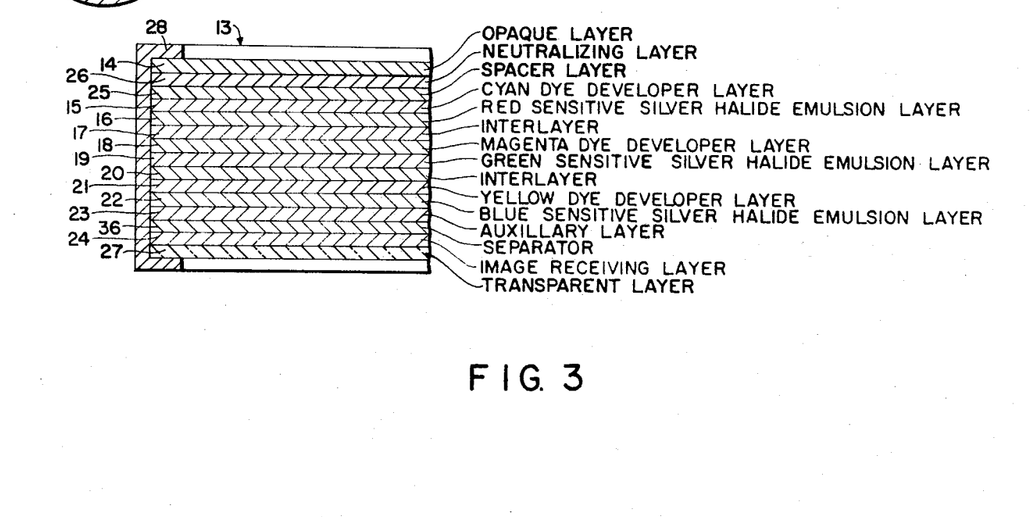
FIGS. 3, 5 and 7 are diagrammatic, further enlarged cross-sectional views of the film unit of FIGS. 2, 4 and 6, along section lines 3—3, 5—5 and 7—7, respectively, further illustrating, in detail, the arrangement of layers comprising the photosensitive laminate during the three illustrated stages of the transfer process.
Figure 4:
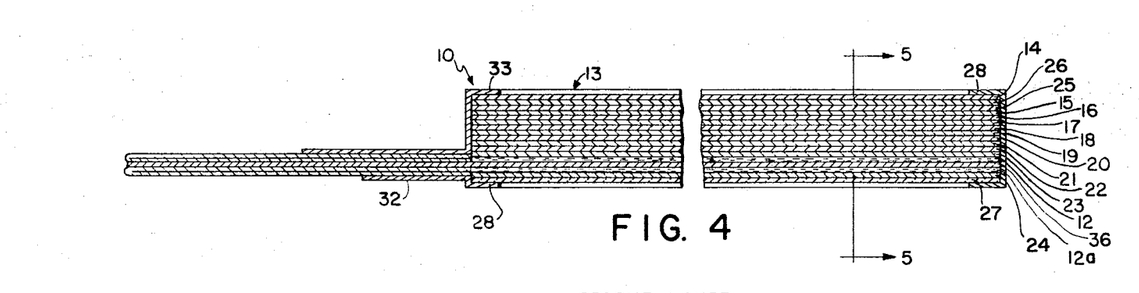
Figure 5:
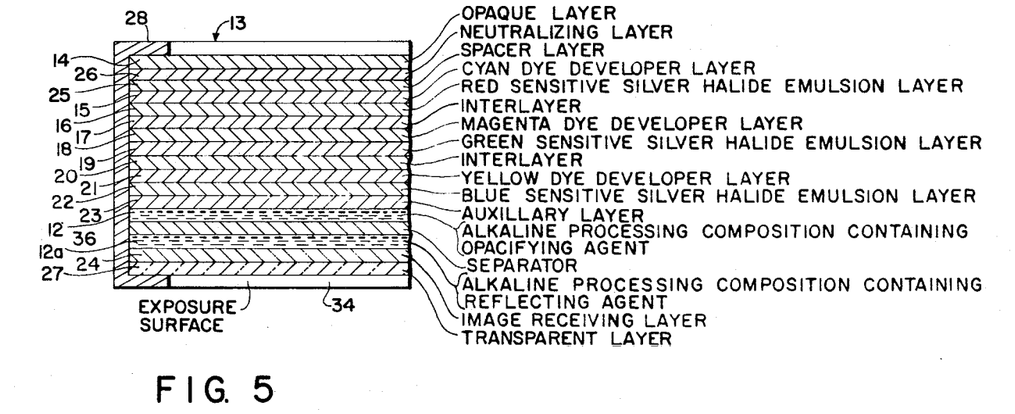

As illustrated in FIGS. 1, 2 and 4, containers 11 and 11a are fixedly positioned and extend transverse a leading edge of photosensitive laminate 13 whereby to effect unidirectional discharge of the respective container's contents 12 and 12a, in order, layerwise, between image-receiving layer 24 and the stated layer next adjacent thereto, upon application of compressive force to containers 11 and 11a.

Thus, containers 11 and 11a, as illustrated in FIG. 2, are fixedly positioned and extend transverse a leading edge of laminate 13 with their longitudinal marginal seals 30 and 30a directed towards the interface between image-receiving layer 24 and auxiliary layer 23. As shown in FIGS. 1, 2 and 4, container 11a is fixedly secured to laminate 13 by extension 32 of tape 28, extending over a portion of one wall 29 of container 11a, and to transparent, processing composition and image dye permeable sheet 36 extending intermediate containers 11 and 11a. Container 11 is in turn, fixedly secured to laminate 13 by a separate retaining member such as illustrated retaining tape 33, extending over a portion of wall 29 of container 11 and a portion of laminate 13's surface generally equal, in areas, to about that covered by tape 28, and to sheet 36 extending intermediate containers 11 and 11a. Each of containers 11 and 11a are thus secured to opposite surfaces of sheet 36 interconnecting walls 29a and 29b of containers 11 and 11a.

Figure 6:
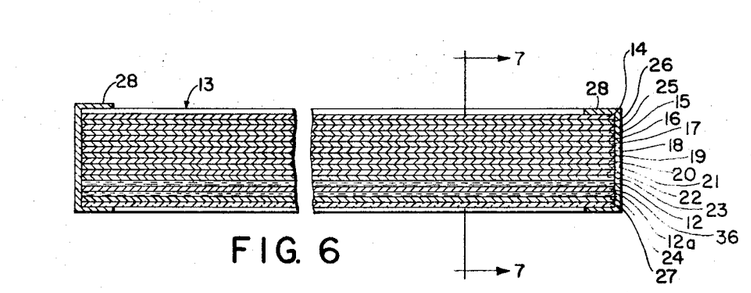
Figure 7:
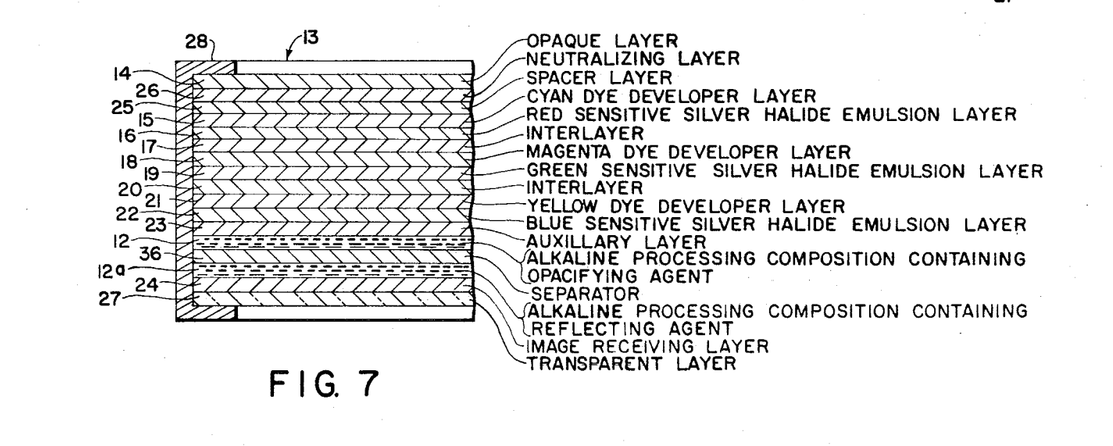

As illustrated in FIG. 6, extension flap 32 of tape 28 is preferably of such area and dimensions that upon, for example, manual separation of containers 11 and 11a and tape 33, subsequent to distribution of processing compositions 12 and 12a, from the remainder of film unit 10, flap 32 may be folded over the edge of laminate 13, previously covered by tape 33, in order to facilitate maintenance of the laminate's structural integrity, for example, during the flexations inevitable in storage and use of the processed film unit, and to provide a suitable mask or frame, for viewing of the transfer image through the picture viewing area of transparent layer 27.

The fluid contents of the containers, taken together, comprise an aqueous solution having a pH at which the dye developers are soluble and diffusible and processing composition 12 contains an opacifying and processing solution 12a a reflecting agent, taken together, in a quantity sufficient to mask the dye developers associated with the silver halide emulsions subsequent to processing to prevent further exposure of the film unit's silver halide emulsion or emulsions, by actinic radiation traversing through the dimensionally stable transparent layer, subsequent to distribution of the processing solutions intermediate the dyeable polymeric layer and the stated layer next adjacent thereto.

Accordingly, the film unit may be processed, subsequent to distribution of the composition, in the presence of such radiation, in view of the fact that the silver halide emulsion or emulsions of the laminate are appropriately protected from incident radiation, at one major surface by the opaque processing composition and at the remaining major surface by a dimensionally stable opaque layer. If the illustrated binder tapes are also opaque, edge leakage of actinic radiation incident on the emulsion or emulsions will also be prevented.

The selected reflecting agent, however, should be one providing a background suitable for viewing the dye developer transfer image formed in the dyeable polymeric layer. In general, while substantially any reflecting agent may be employed, it is preferred that a reflecting agent be selected that will not interfere with the color integrity of the dye transfer image, as viewed by the observer, and, most preferably, an agent which is aesthetically pleasing to the viewer and does not provide a background noise signal degrading, or detracting from, the information content of the image. Particularly desirable reflecting agents will be those providing a white background, for viewing the transfer image, and specifically those conventionally employed to provide background for reflection photographic prints and, especially those agents possessing the optical properties desired for reflection of incident radiation.

As examples of reflecting agents adapted for employment in the practice of the present invention, mention may be made of barium sulfate, zinc oxide, titanium dioxide, barium stearate, silver flake, silicates, alumina, zirconium oxide, zirconium acetyl acetate, sodium zirconium sulfate, kaolin, mica, and the like.

A particularly preferred reflecting agent comprises titanium dioxide due to its highly effective reflection properties. In general, a processing composition containing about 40–50 grams of titanium dioxide dispersed in 100 cc. of water will provide a percent reflectance of incident actinic radiation of about 85–90%, respectively. In the most preferred embodiments, the percent reflectance desired will be in the order of about 85%.

Transparent separator sheet 36 referred to may comprise any of various types of alkaline processing composition permeable rigid or flexible materials including polymeric film or sheet, continuous or mesh, planar or corrugated, of both the synthetic type and those derived from naturally occurring products, including specifically polyamides such as nylon, vinyl polymers, for example, polyvinyl alcohol, partially acetylated polyvinyl alcohol, cellulosic polymers, for example, methyl cellulose, hydroxyethyl cellulose, carboxyethyl cellulose, cellulose sulfate, hydroxy propyl cellulose, and the like, which are generally employed in a thickness of about 0.05 to 1.0 mil.

As examples of opacifying agents adapted for employment in the practice of the present invention, mention may be made of opacifying pigments and opacifying dyes and mixtures of such dyes and/or pigments preferably dyes and pigments of black coloration and most preferably black pigments such as carbon black, iron oxide, titanium (III) oxide, titanium (III) hydroxide, and the like.

Preferred opacifying agent or agents will possess the maximum opacifying capacity per unit weight, be photographically nondeleterious and substantially nondiffusible during and subsequent to distribution of the processing composition containing same. A particularly preferred opacifying agent has been found to comprise carbon black due to its highly efficient absorption characteristics. In general, a processing composition particularly desired for employment in the practice of the present invention will contain carbon black in a concentration effective, e.g., about 3 to 6 grams of carbon black dispersed in 100 cc. of water, to prevent transmission, through the distributed stratum comprising the composition, of in excess of 95% of the actinic radiation incident on the stratum.

In general, preferred agents, both opacifying and reflecting, are those which remain immobile within their respective compositions during the subsequent to photographic processing and particularly those which comprise insoluble and nondiffusible pigment dispersions within their respective processing solutions.

In the performance of a diffusion transfer multicolor process employing film unit 10, the unit is exposed to radiation, actinic to photosensitive laminate 13, incident on the laminate's exposure surface 34, as illustrated in FIG. 2.

Subsequent to exposure, as illustrated by FIGS. 2 and 4, film unit 10 is processed by being passed through op- posed suitably gapped rolls 35 in order to apply compressive pressure to frangible containers 11 and 11a and to effect rupture of longitudinal seals 30 and 30a and distribution of alkaline processing compositions 12 and 12a, having a pH at which the cyan, magenta and yellow dye developers are soluble and diffusible, intermediate dyeable polymeric layer 24 and auxiliary layer 23.

Alkaline processing solutions 12 and 12a permeate emulsion layers 16, 19 and 22 to initiate development of the latent images contained in the respective emulsions. The cyan, magenta and yellow dye developers, of layers 15, 18 and 21, are immobilized, as a function of the development of their respective associated silver halide emulsions, preferably substantially as a result of their conversion from the reduced form to their relatively insoluble and nondiffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developer transfers, by diffusion, to aqueous alkaline solution permeable polymeric layer 24 to provide a multicolor dye transfer image to that layer. Subsequent to substantial transfer image formation, a sufficient portion of the ions comprising aqueous alkaline solutions 12 and 12a transfers, by diffusion, through auxiliary layer 23, emulsion layers 16, 19 and 22, dye developer layers 15, 18 and 21, interlayers 17 and 20, permeable spacer layer 25 and to permeable polymeric acid layer 26 whereby alkaline solutions 12 and 12a decrease in pH, as a function of neutralization, to a pH at which the cyan, magenta and yellow dye developers, in the reduced form, are insoluble and nondiffusible, to provide thereby a stable multicolor dye transfer image.

Subsequent to distribution of processing solutions 12 and 12a, containers 11 and 11a may be manually dissociated from the remainder of the film unit, as described above, to provide the product illustrated in FIG. 6.

For the purpose of facilitating initial distribution of processing solutions 12 and 12a as separate layers, respectively, intermediate dyeable polymeric layer 24 and auxiliary layer 23, film unit 10 is illustrated as possessing permeable polymeric sheet 36 intermediate layers 23 and 24. In such embodiment, processing solution 12 is distributed intermediate sheet 36 and auxiliary layer 23, and processing solution 12a is distributed intermediate sheet 36 and dyeable polymeric layer 24. Alternatively, processing compositions may be employed possessing rheological properties adapted to maintain substantial integrity of the separate solutions during and subsequent to distribution within the film unit laminate. Specifically, it is desirable that the opacifying agent or agents employed not substantially diffuse into and contaminate the optical efficiency of the layer comprising the elected reflecting agent.

The present invention will be further illustrated and detailed in conjunction with the following illustrative constructions which set out representative embodiments and photographic utilization of the novel photographic film units of this invention, which, however, are not limited to the details therein set forth and are intended to be illustrative only.

Film units similar to that shown in the drawing may be prepared, for example, by coating, in succession, on a gelatin subbed, opaque cellulose triacetate film base, the following layers;

(1) The partial butyl ester of polyethylene/maleic anhydride copolymer prepared by refluxing, for 14 hours, 300 grams of high viscosity poly-(ethylene/maleic anhydride), 140 grams of n-butyl alcohol and 1 cc. of 85% phosphoric acid to provide a polymeric acid layer approximately 0.75 mil. thick;

(2) A 2:1 solution of hydroxypropyl cellulose and polyvinyl alcohol in water to provide a polymeric spacer layer approximately 0.25 mil. thick;

(3) A layer of the cyan dye developer 1,4-bis-(β-[hydroquinonyl - α - methyl]-ethylamino) - 5,8 - dihydroxyanthraquinone dispersed in gelatin and coated at a coverage of about 150 mgs./ft.$^2$ of dye and about 200 mgs./ft.$^2$ of gelatin;

(4) A red-sensitive gelatino-silver iodobromide emulsion coated at a coverage of about 200 mgs./ft.$^2$ of silver and about 100 mgs./ft.$^2$ of gelatin;

(5) A layer of gelatin coated at a coverage of about 200 mgs./ft.$^2$;

(6) A layer of the magenta dye developer 2-(p-[β-hydroquinonylethyl]-phenylazo)-4-isopropoxy - 1 - naphthol dispersed in gelatin and coated at a coverage of 70 mgs./ft.$^2$ of dye and about 100 mgs./ft.$^2$ of gelatin;

(7) A green-sensitive gelatino-silver iodobromide emulsion coated at a coverage of about 100 mgs./ft.$^2$ of silver and 60 mgs./ft.$^2$ of gelatin;

(8) A layer containing 4'-methylphenyl hydroquinone dispersed in gelatin and coated at a coverage of about 150 mgs./ft.$^2$ and 25 mgs./ft.$^2$ of 4'-methylphenyl hydroquinone;

(9) A layer of the yellow dye developer 4-(p-[β-hydroquinonylethyl]-phenylazo) - 3 - (N-n-hexylcarboxamido)-1-phenyl-5-pyrazolone dispersed in gelatin and coated at a coverage of about 40 mgs./ft.$^2$ of dye and 50 mgs./ft.$^2$ of gelatin;

(10) A blue-sensitive gelatino-silver iodobromide emulsion coated at a coverage of about 60 mgs./ft.$^2$ of silver and about 50 mgs./ft.$^2$ of gelatin; and (11) A layer of gelatin coated at a coverage of about 30 mgs./ft.$^2$ of gelatin.

Then a transparent cellulose triacetate film base may be coated with a 2:1 mixture, by weight, of polyvinyl alcohol and poly-4-vinylpyridine, at a coverage of approximately 600 mgs./ft., to provide a polymeric image-receiving layer approximately 0.40 mil. thick.

The two components thus prepared may then be taped together in laminate form, at their respective edges, with an intermediate sheet of methyl cellulose 0.05 to 1.0 mil. thick, by means of a pressure-sensitive binding tape extending around, in contact with, and over the edges of the resultant laminate.

Two separate rupturable containers comprising an outer layer of paper, an intermediate layer of lead foil and an inner liner or layer of polyvinyl chloride and retaining, respectively, an aqueous alkaline processing composition comprising:

Water—100 cc.
Potassium hydroxide—11.2 grams
Hydroxyethyl cellulose (high viscosity) [commercially available from Hercules Powder Co., Wilmington, Del. under the trade name Natrasol 250]—3.4 grams
N-benzyl-α-picolinium bromide—1.5 grams
Benzotriazole—1 gram
Carbon black—6 grams and Water—100 cc.
Potassium hydroxide—11.2 grams
Hydroxyethyl cellulose (high viscosity) [commercially available from Hercules Powder Co., Wilmington, Del., under the trade name Natrasol 250]—3.4 grams
N-benzyl-α-picolinium bromide—1.5 grams
Benzotriazole—1 gram
Titanium dioxide—50 grams may then be fixedly mounted on the leading edge, of each of the laminates, by pressure-sensitive tapes interconnecting the respective containers and laminates, such that upon application of compressive pressure to the containers their contents would be distributed, upon rupture of the respective container's marginal seal, in order, between the layer 23 and the polymeric image-receiving layer, the first solution denoted distributed between layer 23 and the methyl cellulose sheet and the second solution denoted distributed between the image-receiving layer and the methyl cellulose sheet.

The photosensitive laminates may then be exposed through step wedges to selectively filtered radiation incident on the transparent cellulose triacetate layer and processed, in the presence of actinic radiation, subsequent to passage of the exposed film unit through suitable gapped opposed rolls, to effect rupture of the containers and distribution of their contents. During processing, the multicolor dye transfer image formation may be viewed through the transparent cellulose triacetate film base and such image formation is found to be substantially completed and exhibiting the required color brillance, hues, saturation, and isolation, within a period of approximately 1–2 minutes.

The pH of the processing solutions taken together initially employed must be an alkaline pH at which the dye developers employed are soluble and diffusible. Although it has been found that the specific pH to be employed may be readily determined empirically for any dye developer, or group of dye developers, most particularly desirable dye developers are soluble at pH's above 9 and relatively insoluble at pH's below 9, in reduced form, and relatively insoluble at substantially any alkaline pH, in oxidized form, and the system can be readily balanced accordingly for such dye developers. In addition, although as previously noted, the processing compositions, in the preferred embodiment, will include the stated film-forming viscosity-increasing agent, or agents, to facilitate spreading of the compositions and to provide maintenance of the spread compositions as structurally stable layers of the laminate, subsequent to distribution, it is not necessary that such agent be employed as a component of the composition. In the latter instance, however, it will be preferred that the concentration of solvent, that is, water, etc., comprising the composition be the minimum amount necessary to conduct the desired transfer process, in order not to adversely affect the structural integrity of the laminate and that the layers forming the laminate can readily accommodate and dissipate the solvent throughout during processing and drying without effecting undesirable dimensional changes in the layers forming the laminate.

It will be noted that the liquid processing composition employed may contain an auxiliary or accelerating developing agent, such as p-methylaminophenol, 2,4-diaminophenol, p-benzylaminophenol, hydroquinone, toluhydroquinone, phenylhydroquinone, 4'-methylphenylhydroquinone, etc. It is also contemplated to employ a plurality of auxiliary or accelerating developing agents, such as a 3-pyrazolidone developing agent and a benzenoid developing agent, as disclosed in U.S. Pat. No. 3,039,869, issued June 19, 1962. As examples of suitable combinations of auxiliary developing agents, mention may be made of 1-phenyl-3-pyrazolidone in combination with p-benzylaminophenol and 1-phenyl-3-pyrazolidone in combination with 2,5-bis-ethylenimino-hydroquinone. Such auxiliary developing agents may be employed in the liquid processing composition or they may be initially incorporated, at least in part, in any one or more of the silver halide emulsion strata, the strata containing the dye developers, the interlayers, the overcoat layer, the image-receiving layer, or in any other auxiliary layer, or layers, of the film unit. It may be noted that at least a portion of the dye developer oxidized during development may be oxidized and immobilized as a result of a reaction, e.g., an energy-transfer reaction, with the oxidation product of an oxidized auxiliary developing agent, the latter developing agent being oxidized by the development of exposed silver halide. Such a reaction of oxidized developing agent with unoxidized dye developer would regenerate the auxiliary developing agent for further reaction with the exposed siliver halide.

In addition, development may be effected in the presence of an onium compound, particularly a quaternary ammonium compound, in accordance with the processes disclosed in U.S. Pat. No. 3,173,786, issued Mar. 16, 1965.

It will be apparent that the relative proportions of the agents of the diffusion transfer processing compositions may be altered to suit the requirements of the operator. Thus, it is within the scope of this invention to modify the herein described developing compositions by the substitution of preservatives, alkalies, etc., other than those specifically mentioned, provided that the pH of the compositions taken together is initially at the first pH required. When desirable, it is also contemplated to include, in the developing composition, components such as restrainers, accelerators, etc. Similarly, the concentration of various components may be varied over a wide range and when desirable adaptable components may be disposed in the photosensitive element, prior to exposure, in a separate permeable layer of the photosensitive element and/or in the photosensitive emulsion.

The dimensionally stable layers referred to may comprise any of various types of conventional opaque and transparent rigid or flexible materials, for example, glass, paper, metal, and polymeric films of both synthetic types and those derived from naturally occurring products. Suitable materials include alkaline solution impermeable materials such as polymethacrylic acid, methyl and ethyl esters; vinyl chloride polymers; polyvinyl acetyl; polyamides such as nylon; polyesters such as polymeric films derived from ethylene glycol terephthalate acid; and cellulose derivatives such as cellulose acetate, triacetate, nitrate, propionate, butyrate, acetate-propionate, or acetate-butyrate. It will be recognized that one or more of the designated layers may not be required where the remaining layers of the laminate are such as to provide the functions of these layers in the absence of same, for example, where the remaining layers of the laminate provide the requisite dimensional stability and radiation filtering properties.

In all examples of this specification, percentages of components are given by weight unless otherwise indicated.

An extensive compilation of specific dye developers particularly adapted for employment in photographic diffusion transfer processes is set forth in aforementioned U.S. Pat No. 2,983,606 and in the various copending U.S. applications referred to in that patent, especially in the table of U.S. applications incorporated by reference into the patent as detailed in column 27. As examples of additional U.S. patents detailing specific dye developers for photographic transfer process use, mention may also be made of U.S. Pats. Nos. 2,983,605; 2,992,106; 3,047,386; 3,076,808; 3,076,820; 3,077,402; 3,126,280; 3,131,061; 3,134,762; 3,134,765; 3,135,604; 3,135,605; 3,135,606; 3,135,734; 3,141,772; 3,142,565; and the like.

As additional examples of synthetic processing composition permeable polymers particularly adapted to retain dispersed dye developer, mention may be made of nitrocarboxymethyl cellulose, as disclosed in U.S. Pat. No. 2,992,104; an acylamidobenzene sulfo ester of a partial sulfobenzal of polyvinyl alcohol, as disclosed in U.S. Pat. No. 3,043,692; polymers of N-alkyl-$\alpha,\beta$-unsaturated carboxamides and copolymers of N-alkyl-$\alpha,\beta$-carboxamides with N-hydroxyalkyl-$\alpha,\beta$-unsaturated carboxamides, as disclosed in U.S. Pat. No. 3,069,263; copolymers of vinylphthalimide and $\alpha,\beta$-unsaturated carboxylic acids, as disclosed in U.S. Pat. No. 3,061,428; copolymers of N-vinylpyrrolidones and $\alpha,\beta$-unsaturated carboxylic acids and terepolymers of N-vinylpyrrolidones, $\alpha,\beta$-unsaturated carboxylic acids and alkyl esters of $\alpha,\beta$-unsaturated carboxylic acids, as disclosed in U.S. Pat. No. 3,044,873; copolymers of N,N-dialkyl-$\alpha,\beta$-unsaturated carboxamides with $\alpha,\beta$-unsaturated carboxylic acids, the corresponding amides of such acids, and copolymers of N-aryl- and N-cycloalkyl-$\alpha,\beta$-unsaturated carboxamides with $\alpha,\beta$-unsaturated carboxylic acids, as disclosed in U.S. Pat. No. 3,069,264; and the like.

In addition to conventional techniques for the direct dispersion of a particulate solid material in a polymeric, or colloidal, matrix such as ball-milling and the like techniques, the preparation of the dye developer dispersion may also be obtained by dissolving the dye in an appropriate solvent, or mixture of solvents, and the resultant solution distributed in the polymeric binder, with optional subsequent removal of the solvent, or solvents, employed, as, for example, by vaporization where the selected solvent, or solvents, possesses a sufficiently low boiling point or washing where the selected solvent, or solvents, possesses a sufficiently high differential solubility in the wash medium, for example, water, when measured against the solubility of the remaining composition components, and/or obtained by dissolving both the polymeric binder and dye in a common solvent.

For further detailed treatment of solvent distribution systems of the types referred to above, and for an extensive compilation of the conventional solvents traditionally employed in the art to effect distribution of photographic color-providing materials in polymeric binders, specifically for the formation component layers of photographic film units, reference may be made to U.S. Pats. Nos. 2,269,158; 2,322,027; 2,304,939; 2,304,940; 2,801,171; and the like.

Although the invention has been discussed in detail throughout employing dye developers, the preferred dye image-providing materials, it will be readily recognized that other, less preferred, dye image-providing materials may be substituted in replacement of the preferred dye developers in the practice of the invention. For example, there may be employed dye image-forming materials such as those disclosed in U.S. Pats. Nos. 2,647,049, issued July 28, 1953; 2,661,293, issued Dec. 1, 1953; 2,698,244, issued Dec. 28, 1954; 2,698,798, issued Jan. 4, 1955; and 2,802,735, issued Aug. 13, 1957, wherein color diffusion transfer processes are described which employ color coupling techniques comprising, at least in part, reacting one or more color developing agents and one or more color formers or couplers to provide a dye transfer image to a superposed image-receiving layer and those disclosed in U.S. Pat. No. 2,774,668, issued Dec. 18, 1956, wherein color diffusion transfer processes are described which employ the imagewise differential transfer of complete dyes by the mechanisms therein described to provide a transfer dye image to a contiguous image-receiving layer.

For the production of the photosensitive gelatino silver halide emulsions employed to provide the film unit, the silver halide crystals may be prepared by reacting a water-soluble silver salt, such as silver nitrate, with at least one water-soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or alternatively, employing any of the various floc systems, or procedures, adapted to effect removal of undesired components, for example, the procedures described in U.S. Pats. Nos. 2,614,928; 2,614,929; 2,728,662; and the like; after-ripening the dispersion at an elevated temperature in combination with the addition of gelatin and various adjuncts, for example, chemical sensitizing agents of U.S. Pats. Nos. 1,574,944; 1,623,499; 2,410,689; 2,597,856; 2,597,915; 2,487,850; 2,518,698; 2,521,926; and the like; all according to the traditional procedures of the art, as described in Neblette, C. B., Photography Its Materials and Processes, 6th ed., 1962.

Optical sensitization of the emulsion's silver halide crystals may be accomplished by contact of the emulsion composition with an effective concentration of the selected optical sensitizing dyes dissolved in an appropriate dispersing solvent such as methanol, ethanol, acetone, water, and the like; all according to the traditional procedures of the art, as described in Hammer, F. M., The Cyanine Dyes and Related Compounds.

Additional optional additives, such as coating aids, hardeners, viscosity-increasing agents, stabilizers, preservatives, and the like, for example, those set forth hereinafter, also may be incorporated in the emulsion formulation, according to the conventional procedures known in the photographic emulsion manufacturing art.

The photoresponsive material of the photographic emulsion will, as previously described, preferably comprise a crystal of silver, for example, one or more of the silver halides such as silver chloride, silver iodide, silver bromide, or mixed silver halides such as silver chlorobromide or silver iodobromide, of varying halide ratios and varying silver concentrations.

The emulsions may include the various adjuncts, or addenda, according to the techniques disclosed in the art, such as speed-increasing compounds of the quaternary ammonium type, as described in U.S. Pats. Nos. 2,271,- 623; 2,288,226; and 2,334,864; or of the polyethyleneglycol type, as described in U.S. Pat. No. 2,708,162; or of the preceding combination, as described in U.S. Pat. No. 2,886,437; or the thiopolymers, as described in U.S. Pats. Nos. 3,046,129 and 3,046,134.

The emulsions may also be stabilized with the salts of the noble metals such as ruthenium, rhodium, palladium, iridium and platinum, as described in U.S. Pats. Nos. 2,566,245 and 2,566,263; the mercury compounds of U.S. Pats. Nos. 2,728,663; 2,728,664 and 2,728,665; the triazoles of U.S. Pat. No. 2,444,608; the azainidines of U.S. Pats. Nos. 2,444,605; 2,444,606; 2,444,607; 2,450,397; 2,444,609; 2,713,541; 2,743,181; 2,716,062; 2,735,769; 2,756,147; 2,772,164; and those disclosed by Burr in "Zwiss. Pot.," volume 47, 1952, pages 2–28; the disulfides of Belgian Pat. No. 569,317; the benzothiazolium compounds of U.S. Pats. Nos. 2,131,038 and 2,694,716; the zinc and cadmium salts of U.S. Pat. No. 2,839,405; and the mercapto compounds of U.S. Pat. No. 2,819,965.

Hardening agents such as inorganic agents providing polyvalent metallic atoms, specifically polyvalent aluminum or chromium ions, for example, potash alum [K$_2$Al$_2$(SO$_4$)$_4$.24H$_2$O] and chrome alum

[K$_2$Cr$_2$(SO$_4$)$_4$.24H$_2$O]

and inorganic agents of the aldehyde type, such as formaldehyde, glyoxal, mucochloric, etc.; the ketone type such as diacetyl; the quinone type; and the specific agents described in U.S. Pats. Nos. 2,080,019; 2,725,294; 2,725,295; 2,725,305; 2,726,162; 2,732,316; 2,950,197; and 2,870,013, may be incorporated, where desired and compatible, in the selected coating solution compositions.

Coating solution compositions employed to fabricate the respective strata of the film unit may contain one or more coating aids, where desired and compatible, such as saponin; a polyethyleneglycol of U.S. Pat. No. 2,831,766; a polyethyleneglycol ether of U.S. Pat. No. 2,719,087, a taurine of U.S. Pat. No. 2,739,891; a maleoprimarate of U.S. Pat. No. 2,823,123; and amino acid of U.S. Pat. No. 3,038,804; a sulfosuccinamate of U.S. Pat. No. 2,992,108; or a polyether of U.S. Pat. No. 2,600,831; or a gelatin plasticizer such as glycerin; a dihydroxyalkane of U.S. Pat. No. 2,960,404; a bis-glycolic acid ester of U.S. Pat. No. 2,904,434; a succinate of U.S. Pat. No. 2,940,854; or a polymeric hydrosol of U.S. Pat. No. 2,852,386.

As a binder for the respective emulsion strata, the aforementioned gelatin may be, in whole or in part, replaced with some other colloidal material such as albumin; casein; or zein; or resins such as a cellulose derivative, as described in U.S. Pats. Nos. 2,322,085 and 2,327,808; polyacrylamides, as described in U.S. Pat. No. 2,541,474; vinyl polymers such as described in U.S. Pats. Nos. 2,253,078; 2,276,322; 2,276,323; 2,281,703; 2,310,- 223; 2,311,058; 2,311,059; 2,414,208; 2,461,023; 2,484,- 456; 2,538,257; 2,579,016; 2,614,931; 2,624,674; 2,632,- 704; 2,642,420; 2,678,884; 2,691,582; 2,752,296; 2,753,- 264; and the like.

Although the preceding description of the invention has been couched in terms of the preferred photosensitive component construction wherein at least two selectively sensitized photosensitive strata are in contiguous coplanar relationship and, specifically, in terms of the preferred tripack type structure comprising a red-sensitive silver halide emulsion stratum, a green-sensitive silver halide emulsion stratum and a blue-sensitive silver halide emulsion stratum having associated therewith, respectively, a cyan dye developer, a magenta dye developer and a yellow dye developer, the photosensitive component of the film unit may comprise at least two sets of selectively sensitized minute photosensitive elements arranged in the form of a photosensitive screen wherein each of the minute photosensitive elements has associated therewith, for example, an appropriate dye developer in or behind its respective silver halide emulsion portion. In general, a suitable photosensitive screen will comprise minute red-sensitized emulsion elements, minute green-sensitized elements and minute blue-sensitized emulsion elements arranged in side-by-side relationship in a screen pattern and having associated therewith, respectively, a cyan, a magenta and a yellow dye developer.

The present invention also includes the employment of a black dye developer and the use of a mixture of dye developers adapted to provide a black and white transfer image, for example, the employment of dye developers of the three subtractive colors in an appropriate mixture in which the quantities of the dye developers are proportioned such that the colors combine to provide black.

Where in the specification, the expression "positive image" has been used, this expression should not be interpreted in a restrictive sense since it is used primarily for purposes of illustration, in that it defines the image produced on the image-carrying layer as being reversed, in the positive-negative sense, with respect to the image in the photosensitive emulsion layers. As an example of an alternative meaning for "positive image," assume that the photosensitive element is exposed to actinic light through a negative transparency. In this case, the latent image in the photosensitive emulsion layers will be a positive and the dye image produced on the image-carrying layer will be a negative. The expression "positive image" is intended to cover such an image produced on the image-carrying layer.

It will be recognized that, by reason of the preferred film unit's structural parameters, the transfer image formed upon direct exposure of the film unit to a selected subject and processing, will be a geometrically reversed image of the subject. Accordingly, to provide transfer image formation geometrically nonreversed, exposure of the film unit should be accomplished through an image reversing optical system such as a camera possessing image reversing optics.

In addition to the described essential layers, it will be recognized that the film unit may also contain one or more subcoats or layers, which, in turn, may contain one or more additives such as plasticizers, intermediate essential layers for the purpose, for example, of improving adhesion, and that any one or more of the described layers may comprise a composite of two or more strata of the same, or different, components and which may be contiguous, or separated from, each other, for example, two or more neutralizing layers or the like, one of which may be disposed intermediate the cyan dye image-forming component retaining layer and the dimensionally stable opaque layer.

Since certain changes may be made in the above product and process without department from the scope of the invention herein involved, it is intended that all matter contained in the above description or shown in the accompaying drawing shall be interpreted as illustrative and not in a limiting sense.

What is claimed is:

1. A photographic film unit which is adapted to be processed by passing said unit between a pair of juxtaposed pressure-applying members and which includes, in combination:

a photosensitive element comprising a composite structure containing, as essential layers, in sequence, a first dimensionally stable support layer, an alkaline solution permeable polymeric acid layer containing sufficient acidifying groups to effect reduction of an alkaline processing composition having a first pH at which a dye image-forming material is substantially soluble and diffusible to a second pH at which said dye image-providing material is substantially insoluble and nondiffusible, a photosensitive silver halide emulsion layer having associated therewith a dye image-providing material which is soluble and diffusible, in alkali, at said first pH, an alkaline solution permeable polymeric layer dyeable by said dye image-providing material, a second dimensionally stable support layer, transparent to incident actinic radiation and means securing said layers in fixed relationship, and rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions, in order, layerwise, intermediate the emulsion layer and dyeable polymeric layer next adjacent said first and second compositions, taken together, possessing said first pH and said opacifying and reflecting agents, taken together, present in a quantity sufficient, upon distribution, to mask dye image-providing material associated with said emulsion layer and to prevent exposure of said emulsion layer during processing in the presence of radiation actinic thereto and incident on said second support layer.

2. A photographic film unit as defined in claim 1 wherein said first dimensionally stable support layer is opaque to actinic radiation.

3. A photographic film unit as defined in claim 1 including an alkaline solution permeable polymeric sheet extending intermediate said dyeable polymeric layer and said photosensitive silver halide emulsion layer next adjacent and said rupturable container means mounted to effect unidirectional discharge of said first composition intermediate said polymeric sheet and the photosensitive silver halide emulsion layer next adjacent and said second composition intermediate said polymeric sheet and the dyeable polymeric layer next adjacent.

4. A photographic film unit as defined in claim 1 wherein said rupturable container means comprise a single rupturable container possessing separate compartments retaining, respectively, said first and said second compositions.

5. A photographic film unit as defined in claim 1 wherein said rupturable container means comprise separate containers retaining, respectively, said first and second compositions.

6. A photographic film unit as defined in claim 1 wherein said dye image-providing material is a dye which is a silver halide developing agent.

7. A photographic film unit as defined in claim 1 wherein said reflecting agent is titanium dioxide.

8. A photographic film unit as defined in claim 6 wherein said opacifying agent is carbon black.

9. A photographic film unit as defined in claim 7 wherein said titanium dioxide is present, upon distribution, in a concentration sufficient to provide reflectance of at least about 85% of the actinic radiation incident on the layer comprising said titanium dioxide.

10. A photographic film unit as defined in claim 1 wherein at least one of said first and said second processing compositions additionally contains a film-forming polymeric material.

11. A photographic film unit as defined in claim 10 wherein said film-forming polymeric material is hydroxyethyl cellulose.

12. A photographic film unit, as defined in claim 2, which is adapted to be processed by passing said unit between a pair of juxtaposed pressure-applying members and which includes, in combination:

a photosensitive element comprising a composite structure containing, as essential layers, in sequence, a dimensionally stable alkaline solution impermeable opaque layer, an alkaline solution permeable transparent polymeric acid layer containing sufficient acidifying groups to effect reduction of a processing solution having a first pH at which a dye image-forming material is substantially soluble and diffusible to a second pH at which said dye image-forming material is substantially insoluble and nondiffusible, at least two selectively sensitized silver halide emulsion layers each having a dye image-forming material, which dye image-forming material is a silver halide developing agent, of predetermined color associated therewith, each of said dye image-forming materials soluble and diffusible, in alkali, at said first pH, an alkaline solution permeable transparent polymeric sheet, an alkaline solution permeable transparent polymeric layer dyeable by said dye image-forming materials, a dimensionally stable alkaline solution impermeable transparent layer, and means securing said layers in fixed relationship, and rupturable container means separately retaining first and second aqueous processing compositions, said first composition containing dispersed therein a substantially nondiffusible opacifying agent and said second composition containing dispersed therein a substantially nondiffusible reflecting agent, fixedly positioned and extending transverse a leading edge of said photosensitive element to effect unidirectional discharge of said first composition intermediate said photosensitive emulsion layer and transparent polymeric sheet and said second composition intermediate said dyeable polymeric layer and said transparent polymeric sheet, said first and second compositions, taken together, possessing said first pH and said opacifying and reflecting agents, taken together, present in a concentration sufficient, upon distribution, to mask dye material associated with said emulsion layer and to prevent exposure of said emulsion layer during processing in the presence of radiation actinic thereto and incident on said dimensionally stable transparent layer.

13. A photographic film unit as defined in claim 12, wherein each of said selectively sensitized photosensitive silver halide emulsion layers has predominant spectral sensitivity to separate regions of the spectrum and the dye image-forming material associated with each of said silver halide emulsion layers possesses a spectral absorption range substantially complementary to the predominant sensitivity range of its associated emulsion layer.

14. A photographic film unit as defined in claim 12, wherein each of said silver halide emulsion layers and its associated dye image-forming material is separated from the next adjacent silver halide emulsion layer and its associated dye image-forming mterial by an alkaline solution permeable polymeric interlayer.

15. A photographic film unit as defined in claim 12, wherein at least one of said dye image-forming materials is disposed in a separate alkaline solution permeable polymeric layer adjacent its associated silver halide emulsion layer intermediate said emulsion layer and said dimensionally stable opaque layer.

16. A photographic film unit as defined in claim 12, including an alkaline solution permeable transparent polymeric spacer layer positioned intermediate said alkaline solution permeable polymeric acid layer and said silver halide emulsion layer and associated dye image-forming material next adjacent.

17. A photographic film unit as defined in claim 16, wherein said alkaline solution permeable polymeric spacer layer has decreasing alkaline solution permeability with increasing temperature.

18. A photographic film unit, as defined in claim 12, which is adapted to be processed by passing said unit between a pair of juxtaposed pressure-applying members and which comprises, in combination:
  a photosensitive element including a composite structure containing, as essential layers, in sequence, a dimensionally stable alkaline solution impermeable opaque layer, an alkaline processing solution permeable polymeric spacer layer, an alkaline solution permeable transparent polymeric acid layer containing sufficient acidifying groups to effect raduction of an alkaline processing solution having a first pH at which selected cyan, magenta and yellow dyes are soluble and diffusible to a second pH at which said dyes are substantially insoluble and nondiffusible, an alkaline processing solution permeable polymeric layer containing cyan dye, a red-sensitive silver halide emulsion layer, an alkaline solution permeable polymeric layer containing magenta dye, a green-sensitive silver halide emulsion layer, an alkaline solution permeable polymeric layer containing yellow dye, a blue-sensitive silver halide emulsion layer, each of said cyan, magenta and yellow dyes being silver halide developing agents and being soluble and diffusible, in alkali, at said first pH, an alkaline solution permeable transparent polymeric sheet, an alkaline solution permeable transparent polymeric layer dyeable by said dyes, a dimensionally stable alkaline solution impermeable transparent layer, means securing at least the side edges of said opposed layers in fixed relationship, and
  rupturable container means separately retaining first and second aqueous processing compositions, said first composition containing dispersed therein an opacifying agent and said second composition containing dispersed therein a reflecting agent, adapted to effect unidirectional discharge of said first composition intermediate said blue-sensitive silver halide emulsion layer and said transparent polymeric sheet and said second composition intermediate said dyeable polymeric layer and said polymeric sheet, said first and second compositions, taken together, present in a quantity sufficient upon distribution to mask said dyes associated with said emulsion layers and to prevent exposure of said emulsion layers during processing in the presence of radiation actinic thereto and incident on said dimensionally stable transparent layer.

19. A process of forming transfer images in color which comprises, in combination, the steps of:
  (a) exposing a photographic film unit which is adapted to be processed by passing the unit between a pair of juxtaposed pressure-applying members and which includes, in combination, a photosensitive element comprising a composite structure containing, as essential layers, in sequence, a dimensionally stable layer, an alkaline solution permeable polymeric acid layer containing sufficient acidifying groups to effect reduction of an alkaline processing solution having a first pH at which a dye image-providing material is substantially soluble and diffusible to a second pH at which said dye image-providing material is substantially insoluble and nondiffusible, a photosensitive silver halide emulsion layer having associated therewith dye image-providing material which is soluble and diffusible, in alkali, at said first pH, an alkaline solution permeable polymeric layer dyeable by said dye image-providing material, a dimensionally stable transparent layer, and means securing said layers in fixed relationship,
    rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first and second compositions, in order, layerwise, intermediate the emulsion layer and adjacent dyeable polymeric layer, said first and second compositions, taken together, possessing said first pH and said opacifying and reflecting agents, taken together, present in a concentration effective, upon distribution to mask dye image-forming material associated with said emulsion layer and to prevent exposure of said emulsion layer during processing in the presence of radiation actinic thereto and incident on said dimensionally stable transparent layer;
  (b) applying compressive force to said rupturable container means to effect said unidirectional discharge of said first and second compositions, in order, layerwise, intermediate the emulsion layer and adjacent dyeable polymeric layer;
  (c) effecting thereby distribution of said opacifying and reflecting agents as substantially separate layers intermediate said emulsion layer and adjacent dyeable polymeric layer in a concentration areawise effective to mask dye image-forming material associated with the emulsion layer and to prevent exposure of said emulsion layer during processing in the presence of radiation actinic thereto and incident on said dimensionally stable transparent layer, and development of said emulsion layer;
  (d) immobilizing the dye image-providing material associated with said emulsion, as a result of said development;
  (e) forming thereby an imagewise distribution of mobile dye image-providing material, as a function of the point-to-point degree of emulsion exposure;
  (f) transferring, by diffusion, at least a portion of said imagewise distribution of mobile dye image-providing material to said alkaline solution permeable polymeric layer dyeable by said dye image-providing material to provide a dye image thereto in terms of said imagewise distribution;
  (g) transferring, by diffusion, subsequent to substantial transfer image formation, a sufficient portion of the ions of said alkaline solution to said alkaline solution permeable polymeric acid layer to thereby reduce the alkalinity of said aqueous alkaline solution to said second pH; and
  (h) maintaining said composite structure intact subsequent to said processing.

20. A process as defined in claim 19 including the step of separating said container means from said composite structure subsequent to substantial transfer image formation.

21. A process as defined in claim 19 wherein said dye image-providing material is a dye which is a silver halide developing agent.

22. A process as defined in claim 19 wherein said reflecting agent is titanium dioxide.

23. A process as defined in claim 22 wherein said opacifying agent is carbon black.

24. A process as defined in claim 22 wherein said titanium dioxide is present, upon distribution, in a concentration effective to provide reflectance of at least about 85% of the actinic radiation incident on the layer comprising said titanium dioxide.

25. A process as defined in claim 19 wherein at least one of said first and second compositions additionally contains a film-forming polymeric material.

26. A process as defined in claim 25 wherein said film-forming polymeric material is hydroxyethyl cellulose.

27. A process of forming transfer images, in color, as defined in claim 19 which comprises, in combination, the steps of:
   (a) exposing a photographic film unit which is adapted to be processed by passing said unit between a pair of juxtaposed pressure-applying members and which includes, in combination, a photosensitive element comprising a composite structure containing, as essential layers, in sequence, a dimensionally stable opaque layer, an alkaline solution permeable transparent polymeric acid layer containing sufficient acidifying groups to effect reduction of a processing solution having a first pH at which a dye image-forming material is substantially soluble and diffusible to a second pH at which said dye image-forming material is substantially insoluble and nondiffusible, at least two selectively sensitized silver halide emulsion layers, each of said silver halide emulsions having associated therewith a dye image-forming material, which dye image-forming material is a silver halide developing agent, of predetermined color, and is soluble and diffusible, in alkali, at said first pH, an alkaline solution permeable transparent polymeric sheet, an alkaline solution permeable transparent polymeric layer dyeable by said dye image-forming materials, a dimensionally stable transparent layer, and means securing said layers in fixed relationship,
      rupturable container means separately retaining first and second aqueous processing compositions, said first composition containing dispersed therein an opacifying agent and said second composition containing dispersed therein a reflecting agent, fixedly positioned and extending transverse a leading edge of said photosesitive element to effect unidirectional discharge of said first composition intermediate the emulsion layer and adjacent transparent polymeric sheet and said second composition intermediate the dyeable polymeric layer and the transparent polymeric sheet, said first and second compositions, taken together, possessing said first pH and said opacifying and reflecting agents, taken together, present in a concentration effective upon distribution to mask dye image-forming material associated with said emulsion layer and to prevent exposure of said emulsion layer during processing in the presence of radiation actinic thereto and incident on said dimensionally stable transparent layer;
   (b) applying compressive force to said rupturable concontainer means to effect said unidirectional discharge of said first composition intermediate the emulsion layer and adjacent transparent polymeric sheet and said second composition intermediate the dyeable polymeric layer and the polymeric sheet;
   (c) effecting thereby distribution of said opacifying and reflecting agents as substantially separate layers intermediate said emulsion layer and adjacent dyeable polymeric layer in a concentration areawise effective to mask dye image-forming material associated with the emulsion layer and to prevent exposure of said emulsion layer during processing in the presence of radiation actinic thereto and incident on said dimensionally stable transparent layer, and development of said emulsion layer;
   (d) immobilizing the dye image-forming material associated with each of said emulsions as a result of development;
   (e) forming an imagewise distribution of mobile dye image-forming material as a function of the point-to-point degree of emulsion exposure;
   (f) transferring, by imbibition, at least a portion of each of said imagewise distributions of mobile dye image-forming material to said alkaline solution permeable polymeric layer dyeable by said dye image-forming materials to provide thereto a dye image;
   (g) transferring, by imbibition, subsequent to substantial transfer image formation, a sufficient portion of the ions of said aqueous alkaline solution to said alkaline solution permeable polymeric acid layer to thereby reduce the alkalinity of said solution to said second pH; and
   (h) maintaining the thus-formed laminate intact subsequent to processing.

28. A process as defined in claim 27, wherein each of said selectively sensitized silver halide emulsion strata has predominant spectral sensitivity to a separate region of the spectrum and the dye image-forming material associated with each of said emulsion strata has a spectral absorption range substantially complementary to the predominant sensitivity range of its associated emulsion.

29. A process of forming transfer images in color, as defined in claim 28, which comprises, in combination, the steps of:
   (a) exposing a photographic film unit which is adapted to be processed by passing said unit between a pair of juxtaposed pressure-applying members and which includes, in combination, a photosensitive element comprising a composite structure containing, as essential layers, in sequence, a dimensionally stable alkaline solution impermeable opaque layer, an alkaline processing solution permeable transparent polymeric acid layer containing sufficient acidifying groups to effect reduction of a processing solution having a first pH at which selected cyan, magenta and yellow dyes are soluble and diffusible to a second pH at which said dyes are substantially insoluble and nondiffusible, an alkaline processing solution permeable polymeric spacer layer, an alkaline processing solution permeable polymeric layer containing cyan dye, a red-sensitive silver halide emulsion layer, an alkaline solution permeable polymeric layer containing magenta dye, a green-sensitive silver halide emulsion layer, an alkaline solution permeable polymeric layer containing yellow dye, a blue-sensitive silver halide emulsion layer, each of said cyan, magenta and yellow dyes being silver halide developing agents and being soluble and diffusible, in alkali, at said first pH, an alkaline solution permeable transparent polymeric sheet, an alkaline processing solution permeable transparent polymeric layer dyeabie by each of said dyes, a dimensionally stable transparent layer, and means securing said layers in fixed relationship,
      rupturable container means separately retaining first and second aqueous processing compositions, said first composition containing dispersed therein an opacifying agent and said second composition containing dispersed therein a reflecting agent, fixedly positioned and extending transverse a leading edge of said photosensitive element to effect unidirectional discharge of said first composition intermediate said emulsion layer and said transparent polymeric sheet and said second composition intermediate said dyeable polymeric layer and said transparent polymeric sheet, said first and second compositions, taken together, possessing said first pH and said opacifying and reflecting agents, taken together, present in a concentration effective, upon distribution, to mask dye image-forming material associated with said emulsion layer and to prevent exposure of said emulsion layer during processing in the presence of radiation actinic thereto and incident on said dimensionally stable transparent layer;

(b) applying compressive force to said rupturable container means to effect said unidirectional discharge of said first composition intermediate said emulsion layer and said transparent polymeric sheet and said second composition said intermediate dyeable polymeric layer and said transparent polymeric sheet;

(c) effecting thereby distribution of said opacifying and reflecting agents as substantially separate layers intermediate said emulsion layer and adjacent dyeable polymeric layer in a concentration areawise effective to mask dye associated with the emulsion layer and to prevent exposure of said emulsion layer during processing in the presence of radiation actinic thereto and incident on said dimensionally stable transparent layer, and development of the latent images contained in each of said silver halide emulsions;

(d) immobilizing said yellow, magenta and cyan dye, as a result of development of their respective associated silver halide emulsions;

(e) forming thereby an imagewise distribution of mobile yellow, magenta and cyan dye, as a function of the point-to-point degree of exposure of their respective associated silver halide emulsions;

(f) transferring, by diffusion, at least a portion of each of said imagewise distributions of mobile dye to said alkaline solution permeable polymeric layer dyeable by said dyes to provide thereto a multicolor dye image;

(g) transferring, by diffusion, subsequent to substantial transfer image formation, a sufficient portion of the ions of said aqueous alkaline solution to said alkaline solution permeable polymeric acid layer to thereby reduce the alkalinity of said solution to said second pH; and (h) maintaining said composite structure intact subsequent to processing.

30. A process as defined in claim 29 wherein said first pH is about 9 and said second pH is below 9.

References Cited
UNITED STATES PATENTS 3,473,925   10/1969   Milligan et al. __________ 96—3

NORMAN G. TORCHIN, Primary Examiner

A. T. SURO PICO, Assistant Examiner

U.S. Cl. X.R.

96—29, 77

Disclaimer 3,573,042.—*Terry W. Milligan*, Belmont, and *Richard W. Young*, Wellesley Hills, Mass. PHOTOGRAPHIC COLOR DIFFUSION TRANSFER PROCESSES AND FILM UNIT FOR USE THEREIN. Patent dated Mar. 30, 1971. Disclaimer filed Mar. 29, 1972, by the assignee, *Polaroid Corporation*.

Hereby disclaims the portion of the term of the patent subsequent to Oct. 21, 1986.

[*Official Gazette June 13, 1972.*]